United States Patent [19]

Weilenmann et al.

[11] 4,365,961
[45] Dec. 28, 1982

[54] FRICTION CLUTCH INCLUDING ROLLING BODIES FOR TRANSMITTING A LIMITED TORQUE

[75] Inventors: Walter Weilenmann, Schaanwald; Nikolaus Frick, Schaan, both of Liechtenstein

[73] Assignee: Hilti Aktiengesellschaft, Schaan, Liechtenstein

[21] Appl. No.: 215,405

[22] Filed: Dec. 11, 1980

[30] Foreign Application Priority Data

Dec. 12, 1979 [DE] Fed. Rep. of Germany ........ 2949990

[51] Int. Cl.³ .............................................. F16D 7/02
[52] U.S. Cl. ...................................................... 464/36
[58] Field of Search ............................ 64/30 R, 30 C; 192/56 R; 464/36

[56] References Cited

U.S. PATENT DOCUMENTS

| | | | |
|---|---|---|---|
| 1,632,539 | 6/1927 | Chilton | 64/30 C |
| 1,739,947 | 12/1929 | Chilton | 64/30 C |
| 2,587,712 | 3/1952 | Dodge | 64/30 R X |
| 3,616,883 | 11/1971 | Sindelar | 192/56 R |

FOREIGN PATENT DOCUMENTS

| | | | |
|---|---|---|---|
| 430562 | 6/1926 | Fed. Rep. of Germany | 64/30 C |
| 7243689 | 4/1973 | Fed. Rep. of Germany | . |
| 1474653 | 5/1977 | United Kingdom | . |
| 561818 | 6/1977 | U.S.S.R. | 64/30 R |
| 700714 | 12/1979 | U.S.S.R. | 64/30 R |

*Primary Examiner*—Allan D. Herrmann
*Attorney, Agent, or Firm*—Toren, McGeady & Stanger

[57] ABSTRACT

In a friction clutch a first disc-shaped driving member and a second disc-shaped driving member are held in frictional contact by a spring so that the driving members rotate coaxially, each driving member has a facing surface directed toward the other. Rolling members are positioned between the facing surfaces and seat in opposed indentations when the driving members rotate as a unit. When a predetermined torque is exceeded, the biasing action of the spring is overcome and the driving members move away from one another in the axial direction. During such axial displacement, the rolling members move out of at least the indentations in one of the driving members and aid in the separation of the driving members.

6 Claims, 2 Drawing Figures

FRICTION CLUTCH INCLUDING ROLLING BODIES FOR TRANSMITTING A LIMITED TORQUE

SUMMARY OF THE INVENTION

The present invention is directed to a friction clutch for the transmission of a limited torque including two frictionally engageable disc-shaped driving members which can be disengaged by axial displacement against a spring biasing action.

In motor-driven, hand-held tools, such as hand-held drills or hammer drills, a safety clutch must be provided in the rotary drive between the motor and the tool for safety reasons so that the continued transmission of torque between the motor and the tool can be discontinued if the tool becomes jammed in the work material.

For this purpose, mechanical safety clutches have been used almost exclusively. Such clutches have been catch clutches or friction clutches. With the known constructions of these clutches, there has been the significant disadvantage that, after exceeding the maximum or predetermined torque of the clutch, the driving members can rotate relative to one another, however, this relative rotation occurs under a no-load torque which is still relatively high as compared to the release torque with the result that though the clutch has been released, the operator is still exposed to the high no-load torque transmitted to the handle of the device when the motor continues to run.

In one known friction clutch, disc-shaped driving member is fixed on a drive shaft so that it rotates with the shaft. A second disc-shaped driving member provides the power take-off feature and is supported concentrically and axially movably relative to the first driving member. For the transmission of torque, the second driving member is pressed by a compression spring against an end face of the first driving member with the intermediate arrangement of a friction disc. If the limited torque defined by the spring action and the friction coefficient of the friction disc is exceeded, the two driving members rotate relative to one another and, during such rotation, the spring maintains the frictional engagement of the two driving members with the friction disc so that a disadvantageously high no-load torque exists between the driving members, as mentioned above.

The primary object of the present invention is to provide a safety clutch for the transmission of torque distinguished by a minimum no-load torque.

In accordance with the present invention, rolling bodies are positioned between the disc-shaped driving members with the rolling bodies seated in recesses or indentations in the facing surfaces of the driving members while their frictional surfaces are in contact. If the limited torque to be transmitted by the clutch is exceeded, then the driving members rotate relative to one another and the rolling bodies move out of the recesses in at least one of the driving members with an axial shifting of the driving members taking place against the biasing action of a spring.

With the clutch engaged, the driving members are in mutual frictional contact due to the spring force acting on them so that the degree of frictional engagement can be controlled by the appropriate choice of the spring and a suitable choice of the material for the frictional surfaces of the driving members. In the engaged state, each rolling body is arranged between the facing surfaces of the driving members and is seated passively in a pair of cooperating recesses or indentations in both driving members. Advantageously, the recesses have the same depth and shape.

If the tool is jammed during use, a very high torque suddenly acts on the driving members and this torque overcomes the frictional engagement between the driving members and causes them to rotate relative to one another. At the commencement of this relative rotation, the rolling bodies are displaced out of the recesses in at least one driving member and cause an axial lifting or displacement of the one driving member relative to the other. Further, contact between the friction surfaces of the driving members is also immediately interrupted and the transmission of torque between the driving members is discontinued.

When the driving members continue to rotate relative to one another, the rolling bodies roll between the driving members and maintain them in the disengaged position. Accordingly, the rolling bodies form a roller bearing for the driving members which rotate relative to one another with the relative rotation between the driving members taking place under rolling friction and, therefore, without the significant frictional restraint, that is, minimum no-load torque is obtained. Frictional reengagement of the driving members while they rotate relative to one another can be prevented even at low working speeds by means of indentations of recesses with a saw-tooth profile. With such a profile, the steep side is arranged in front of the rolling direction of the rolling bodies. As a result, the rolling bodies jump over the deepest portion of the indentation maintaining the friction contact surfaces in spaced relation to one another.

To obtain a defined and uniform disengagement of the driving members and also to ensure planar-parallel guidance of the driving members relative to one another in the disengaged state, it is preferable if at least three rolling bodies are provided at equiangular spacings and at equal radial distances from the center or axis of the driving members.

During relative rotation of the driving members, experience has shown that the rolling bodies which have lifted out of the indentations maintain the same angular spacing as they continue to roll. With time, however, the angular spacing may vary due to contamination or other impairing influences, therefore, another feature of the invention involves the provision of a cage for guiding the rolling bodies. The cage may be constructed as a star having arms maintaining the rolling bodies in the desired angular spacing. An advantageous and simple construction of the cage, however, has been found to be in the form of a ring having bores for receiving the rolling bodies in the desired angular spacing and also in the radial spacing of the indentations from the center of the driving members. Accordingly, the receiving bores maintain the rolling bodies or balls at the requisite radial distance from the center of the ring or of the driving members. Such an arrangement is especially advantageous in high-speed devices in which the clutch members are subjected to significant centrifugal force.

Spherical rolling bodies have proved to be problem-free, while cylindrical rolling bodies are also suitable, especially for the application of great disengaging forces. Ball-shaped rolling bodies have the significant advantage of a good rolling behavior. Moreover, balls can be mass-produced and, therefore, are inexpensive and can be obtained in any desired quality.

For guiding the balls in the circumferential direction, at least one of the driving members is provided with an annular guide track. With such an arrangement, maintaining the desired radial spacing of the rolling bodies by means of the cage may be unnecessary.

To obtain high contacting forces, it is preferable if the driving members have conical friction surfaces. The angular disposition of the friction surfaces can be advantageously selected so that a self-locking engagement is provided between the driving member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
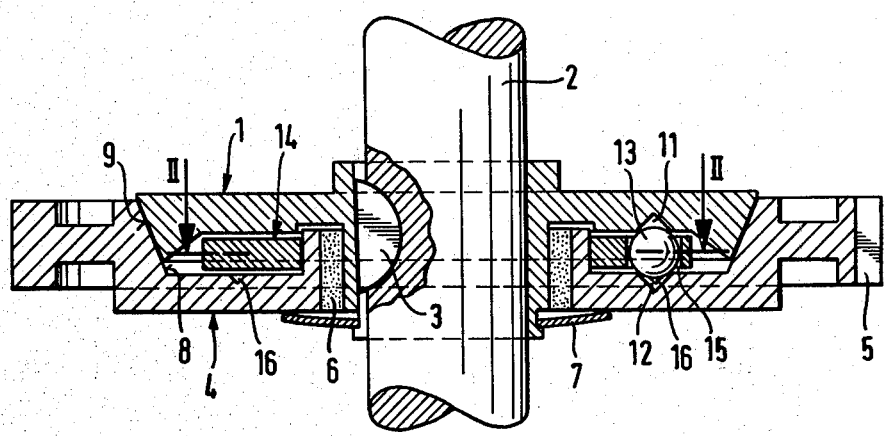
FIG. 1 is a sectional view of an engaged friction clutch embodying the present invention.

The friction clutch embodying the present invention is illustrated in FIG. 1 and consists of a drive member 1 fixed on a shaft 2 by means of a half-round key 3. The drive member 1 rotates with the shaft and is held so that it cannot move axially relative to the shaft. Concentrically mounted about the shaft 2 is a driven member 4. External toothing 5 is located about the outer periphery of the driven member 4. A sliding bearing 6 is positioned between the drive member 1 and the driven member 4 and serves for the rotatable support of the driven member relative to the drive member. Further, this sliding bearing ring 6 also ensures the ability of the drive member 1 and driven member 4 to effect relative axial movement. A compression spring 7 laterally encircles the shaft 2 and is supported on the drive member 1 and biases the driven member 4 into frictional contact with the drive member. Driven member 4 has a frusto-conically shaped friction surface 8 in contacting engagement with a corresponding frusto-conical friction surface 9 on the drive member. The friction surfaces 8 and 9 afford the transmission of torque between the drive member 1 and the driven member 4.

Each of the drive member 1 and the driven member 4 have a surface extending transversely of the axis of the shaft 2 and facing the other. Each of these surfaces has V-shaped indentations 11, 12 in the drive member 1 and driven member 4, respectively. In the engaged state of the clutch shown in FIG. 1, the V-shaped indentations are located opposite one another. Each pair of indentations 11, 12 are distributed equiangularly about the surfaces of the members 1, 4 in three equiangular spacings. A rolling body in the form of a ball 13 is positioned in and extends between each pair of the indentations. Balls 13 are mounted in annular cage 14 located between the facing surfaces of the drive member 1 and driven member 4. Receiving bores 15 are provided in the cage and hold the balls 13 at the desired equiangular spacing of the indentations. The cage 14 is rotatably arranged in the space between the facing surfaces of the drive member 1 and the driven member 4.

An annular guide track 16 formed in the facing surface of the driven member 4 serves as a guide for the balls 13 when the clutch is in a disengaged state. The annular guide track 16 is spaced radially outwardly from the center of the shaft at the same distance as the indentations 11, 12 and, accordingly, leads the balls into the three indentations 12 formed in the driven member 4.

Figure 2:
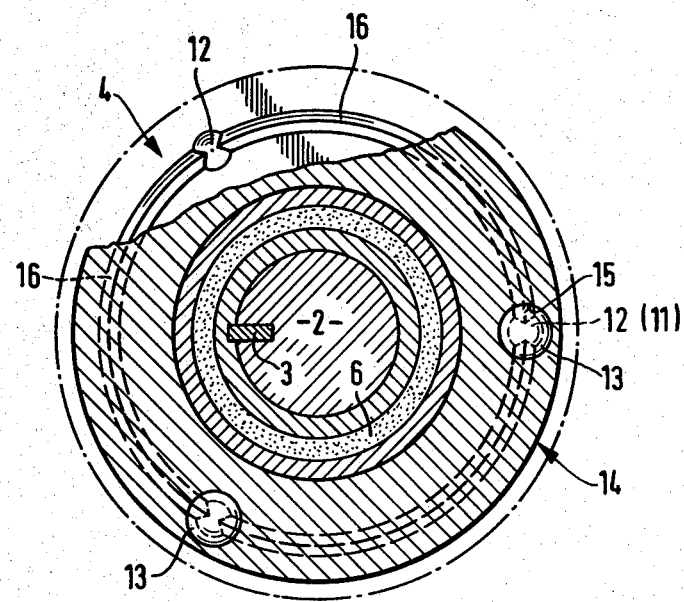
FIG. 2 is a sectional view through the friction clutch in FIG. 1 taken along the line II—II.

In FIG. 2 the three equiangularly spaced indentations 11, 12 and the similarly spaced balls 13 are shown. Furthermore, the shape of the guide track 16 is illustrated and it can be seen in FIG. 1 that the guide track 16 has a smaller depth than the indentations 12.

As shown in FIG. 1, the drive member 1 and the driven member 4 are in engagement so that they rotate together as a unit. When the torque being transmitted through the clutch, as defined by the frictional engagement between the friction surface 8, 9 is exceeded, the drive member 1 and the driven member 4 begin to rotate relative to one another. Accordingly, the balls 13 are forced out of indentations 11, 12 and cause the drive member and driven member to be forced axially apart so that the engaging contact between the friction surfaces 8, 9 is interrupted. As the drive member 1 and driven member 4 continue to rotate relative to one another, the balls 13 roll in the guide track 16 and on the same circle on the facing surface of the drive member 1. In this way, the drive member 1 and driven member 4 are displaced out of engaging contact and can rotate relative to one another under a minimum no-load torque.

While specific embodiments of the invention have been shown and described in detail to illustrate the application of the inventive principles, it will be understood that the invention may be embodied otherwise without departing from such principles.

What is claimed is:

1. Friction clutch for the transmission of a limited torque comprising a first disc-shaped driving member having a friction surface, a second disc-shaped driving member having a friction surface, a spring biasing said first and second driving members together with said friction surfaces thereon disposed in frictional contact, said first and second driving members being coaxially rotatable, and said first and second driving members being disengageable from frictional contact when a predetermined driving torque is exceeded, each of said first and second disc-shaped driving members having a facing surface directed toward said facing surface on the other one of said first and second drive members, a plurality of rolling bodies positioned between said facing surfaces, each said facing surface having a plurality of indentations formed therein with each indentation arranged to receive one of said rolling bodies, said indentations in said facing surfaces disposed opposite one another so that one said rolling body engages in a pair of said indentations when said first and second driving members are in frictional contact and when said first and second driving members rotate relative to one another as the predetermined driving torque is exceeded, said rolling bodies move out of said indentations in at least one of said driving members as said driving members move in the axial direction against the force of said spring, and an annular cage is positioned between said facing surfaces of said first and second driving members with said rolling bodies mounted in said cage for maintaining said rolling bodies equiangularly spaced apart and in a desired radial spacing relative to the axes of said driving members.

2. Friction clutch, as set forth in claim 1, wherein at least three said rolling bodies are equiangularly spaced apart between said facing surfaces of said first and second driving members with said rolling bodies being spaced an equal radial distance outwardly from the center of said first and second drive members.

3. Friction clutch, as set forth in claim 2, wherein said rolling bodies are ball-shaped members.

4. Friction clutch, as set forth in claim 3, wherein an annular guide track is formed in one of the facing surfaces of said first and second driving members, said guide track being concentric to the center of said disc-shaped driving members and said balls travelling in said guide track when said first and second driving members move relative to one another.

5. Friction clutch, as set forth in claim 1, wherein said friction surfaces on said first and second driving members being frusto-conically shaped and arranged to interfit one into the other.

6. Friction clutch, as set forth in claim 1, wherein said indentations being V-shaped.

* * * * *